US008953107B2

(12) United States Patent
Uehara et al.

(10) Patent No.: US 8,953,107 B2
(45) Date of Patent: Feb. 10, 2015

(54) LIQUID CRYSTAL OPTICAL APPARATUS AND STEREOSCOPIC IMAGE DISPLAY DEVICE

(75) Inventors: Shinichi Uehara, Tokyo (JP); Masako Kashiwagi, Kanagawa-ken (JP); Ayako Takagi, Kanagawa-ken (JP); Masahiro Baba, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 228 days.

(21) Appl. No.: 13/615,679

(22) Filed: Sep. 14, 2012

(65) Prior Publication Data

US 2013/0222715 A1    Aug. 29, 2013

(30) Foreign Application Priority Data

Feb. 28, 2012    (JP) ................ 2012-042542

(51) Int. Cl.
*G02F 1/1335* (2006.01)
*G02F 1/1343* (2006.01)
*G02B 27/22* (2006.01)
*G02B 26/08* (2006.01)

(52) U.S. Cl.
CPC .......... *G02F 1/1343* (2013.01); *G02B 27/2214* (2013.01); *G02B 27/2264* (2013.01); *G02B 26/0816* (2013.01)
USPC ............................. 349/15; 349/139

(58) Field of Classification Search
CPC .......... G02B 27/2214; H04N 13/0402; H04N 13/0404; H04N 13/0409; H04N 13/0411
USPC ................................................ 349/15
See application file for complete search history.

(56) References Cited

U.S. PATENT DOCUMENTS

2007/0200990 A1* 8/2007 Hirosawa et al. ............. 349/129
2010/0238276 A1 9/2010 Takagi et al.

FOREIGN PATENT DOCUMENTS

JP    2010-224191    10/2010

OTHER PUBLICATIONS

Notification of Reason(s) for Refusal issued by the Japanese Patent Office on Apr. 16, 2014, for Japanese Patent Application No. 2012-042542, and English-language translation thereof.

* cited by examiner

*Primary Examiner* — Thanh-Nhan P Nguyen
(74) *Attorney, Agent, or Firm* — Finnegan, Henderson, Farabow, Garrett & Dunner, L.L.P.

(57) ABSTRACT

According to one embodiment, a liquid crystal optical apparatus includes first and second substrate units, and a liquid crystal layer. The first substrate unit includes a first substrate and first electrodes. The first electrodes are provided on the first substrate to extend along a first direction, and arranged in a second direction perpendicular to the first direction. The second substrate unit includes a second substrate and a second electrode. The second substrate opposes the first substrate. The second electrode is provided on the second substrate to oppose the first electrodes. The liquid crystal layer is provided between the first and second substrate units. At least one of the first electrodes is provided with a recess formed on a surface of the at least one of the first electrodes. The surface opposes the second electrode.

19 Claims, 11 Drawing Sheets

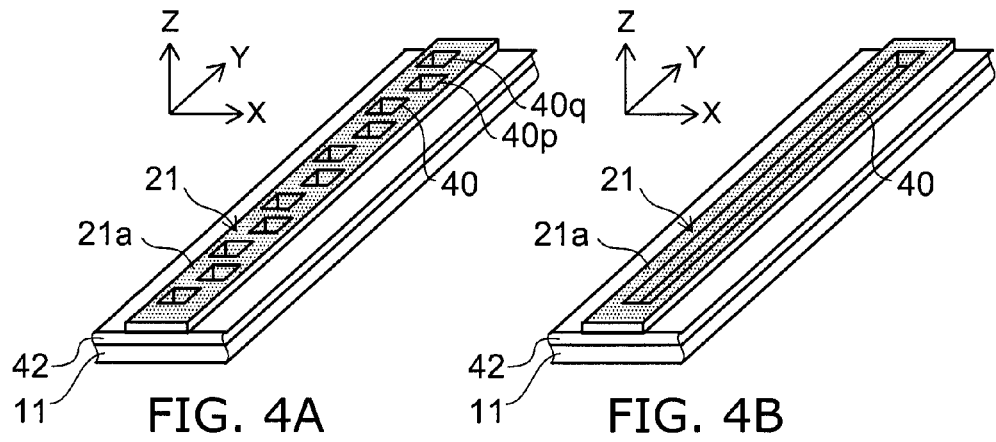
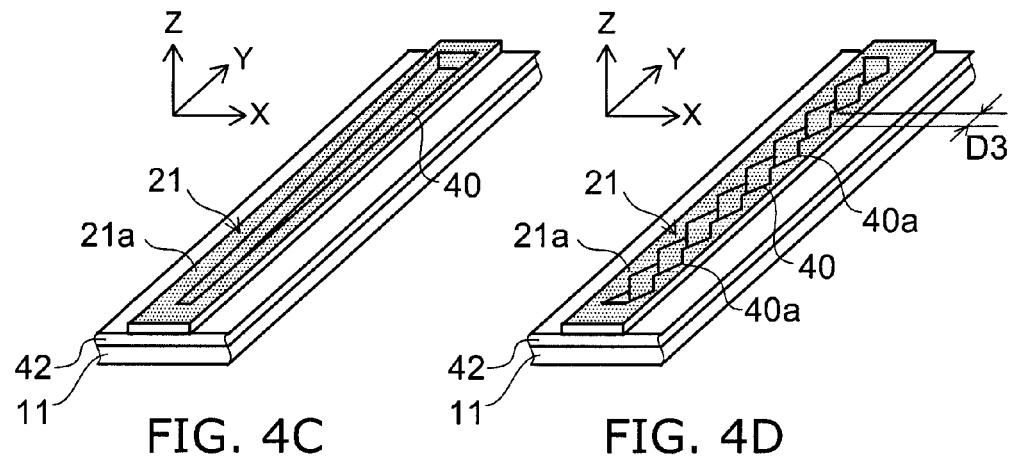
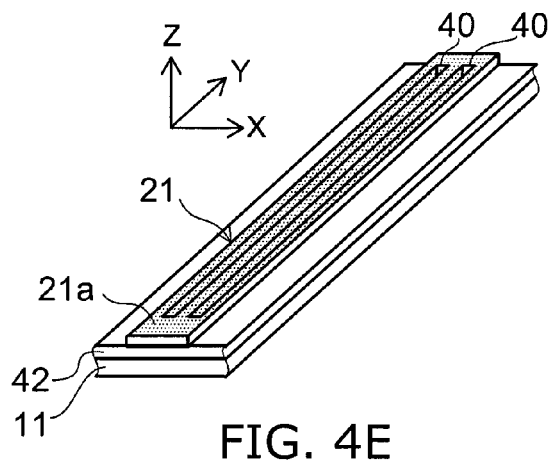

LIQUID CRYSTAL OPTICAL APPARATUS AND STEREOSCOPIC IMAGE DISPLAY DEVICE

CROSS-REFERENCE TO RELATED APPLICATIONS

This application is based upon and claims the benefit of priority from the prior Japanese Patent Application No. 2012-042542, filed on Feb. 28, 2012; the entire contents of which are incorporated herein by reference.

FIELD

Embodiments described herein relate generally to a liquid crystal optical apparatus and a stereographic image display device.

BACKGROUND

A liquid crystal optical apparatus is known in which the distribution of the refractive index is changed according to the application of a voltage by utilizing the birefringence of liquid crystal molecules. There exists a stereoscopic image display device that combines an image display unit with such a liquid crystal optical apparatus.

By changing the distribution of the refractive index of the liquid crystal optical apparatus, the stereoscopic image display device switches between a state in which the image displayed on the image display unit is incident on the eyes of the human viewer as displayed on the image display unit and a state in which the image displayed on the image display unit is incident on the eyes of the human viewer as multiple parallax images. Thereby, a high definition two-dimensional image display operation and a three-dimensional image display operation are realized, where the three-dimensional image display operation includes stereoscopic viewing with the naked eyes due to the multiple parallax images. It is desirable to realize good optical characteristics of the liquid crystal optical apparatus used in the stereoscopic image display device.

BRIEF DESCRIPTION OF THE DRAWINGS

FIG. 4A to FIG. 4E are schematic perspective views illustrating the configuration of a portion of another stereoscopic image display device according to the first embodiment;

DETAILED DESCRIPTION

Figure 1A:
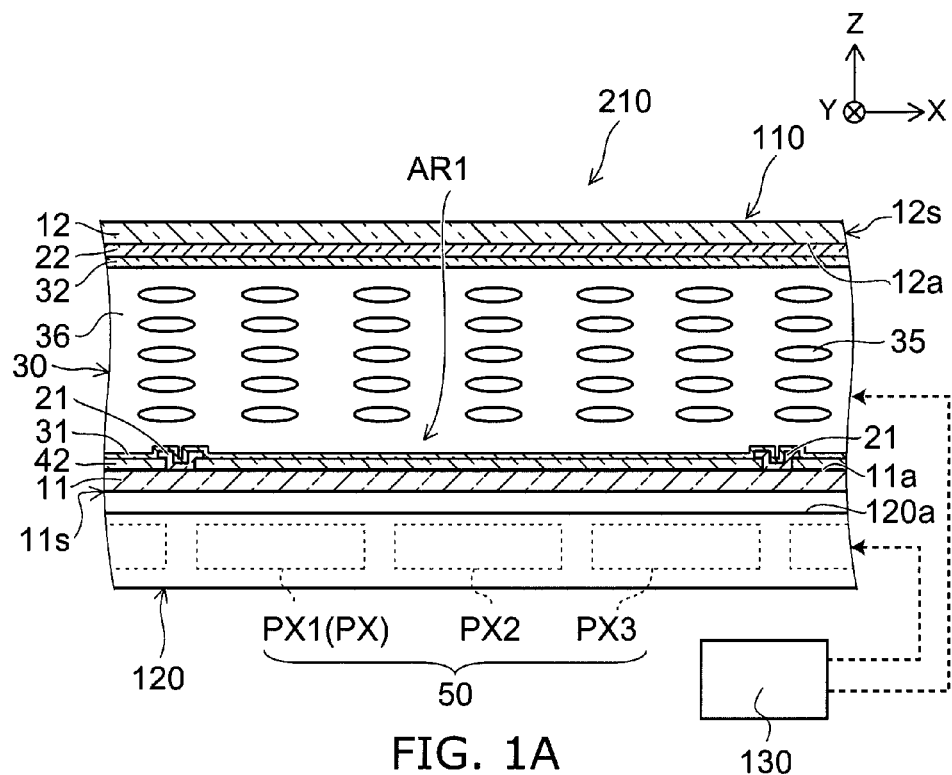
FIG. 1A and FIG. 1B are schematic cross-sectional views illustrating the configuration of a stereoscopic image display device according to a first embodiment.

According to one embodiment, a liquid crystal optical apparatus includes a first substrate unit, a second substrate unit, and a liquid crystal layer. The first substrate unit includes a first substrate and a plurality of first electrodes. The first electrodes are provided on the first substrate to extend along a first direction. The first electrodes are arranged in a second direction perpendicular to the first direction. The second substrate unit includes a second substrate and a second electrode. The second substrate opposes the first substrate. The second electrode is provided on the second substrate to oppose the first electrodes. The liquid crystal layer is provided between the first substrate unit and the second substrate unit. At least one of the first electrodes is provided with a recess formed on a surface of the at least one of the first electrodes. The surface opposes the second electrode.

According to one embodiment, a liquid crystal optical apparatus includes a first substrate unit, a second substrate unit, and a liquid crystal layer. The first substrate unit includes a first substrate and a plurality of first electrodes. The first electrodes are provided on the first substrate to extend along a first direction. The first electrodes are arranged in a second direction perpendicular to the first direction. The second substrate unit includes a second substrate and a second electrode. The second substrate opposes the first substrate. The second electrode is provided on the second substrate to oppose the first electrodes. The liquid crystal layer is provided between the first substrate unit and the second substrate unit. At least one of the first electrodes is provided with a protrusion formed on a surface of the at least one of the first electrodes. The surface opposes the second electrode.

According to one embodiment, a stereoscopic image display device includes a liquid crystal optical unit and an image display unit. The liquid crystal optical unit includes a first substrate unit, a second substrate unit, and a liquid crystal layer. The first substrate unit includes a first substrate and a plurality of first electrodes. The first electrodes are provided on the first substrate to extend along a first direction. The first electrodes are arranged in a second direction perpendicular to the first direction. The second substrate unit includes a second substrate and a second electrode. The second substrate opposes the first substrate. The second electrode is provided on the second substrate to oppose the first electrodes. The liquid crystal layer is provided between the first substrate unit and the second substrate unit. At least one of the first electrodes is provided with a recess formed on a surface of the at least one of the first electrodes. The surface opposes the second electrode. The image display unit is stacked with the liquid crystal optical unit. The image display unit has a display surface configured to display an image, Various embodiments will be described hereinafter with reference to the accompanying drawings.

The drawings are schematic or conceptual; and the relationships between the thicknesses and the widths of portions, the proportions of sizes between portions, etc., are not necessarily the same as the actual values thereof. The dimensions and/or the proportions may be illustrated differently among the drawings, even for identical portions.

In the specification and the drawings of the application, components similar to those described in regard to a drawing thereinabove are marked with like reference numerals, and a detailed description is omitted as appropriate.

First Embodiment

Figure 1B:
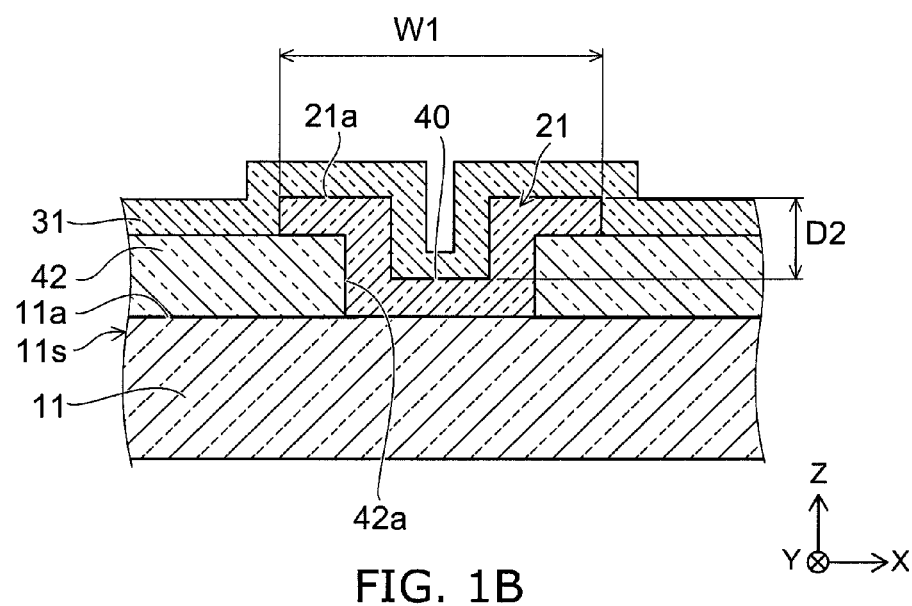

FIG. 1A and FIG. 1B are schematic cross-sectional views illustrating the configuration of a stereoscopic image display device according to a first embodiment.

Figure 2:
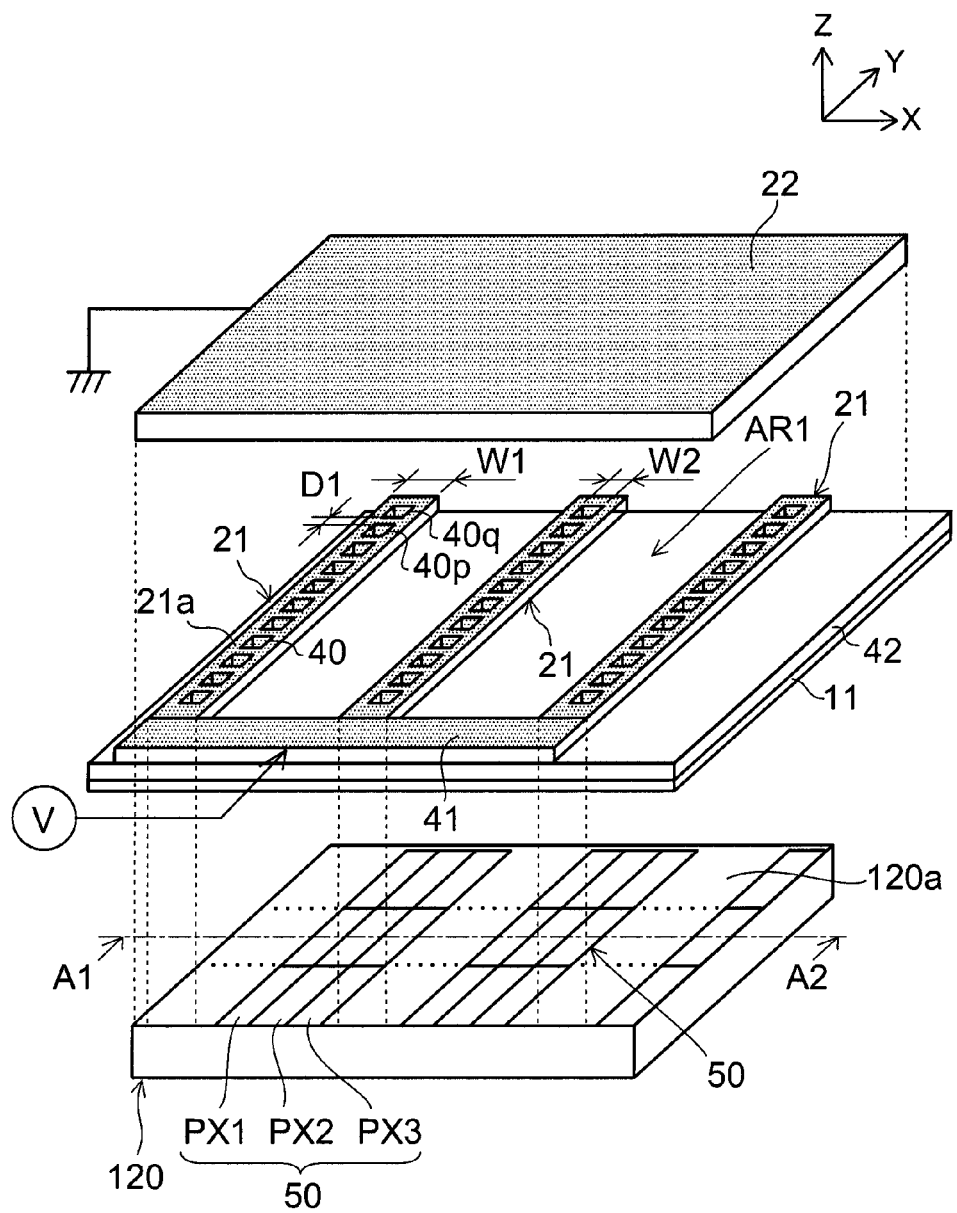
FIG. 2 is a schematic perspective view illustrating the configuration of a portion of the stereoscopic image display device according to the first embodiment.

FIG. 2 is a schematic perspective view illustrating the configuration of a portion of the stereoscopic image display device according to the first embodiment.

FIG. 1A and FIG. 1B schematically illustrate the cross section along line A1-A2 of FIG. 2. FIG. 1B illustrates an enlarged portion of FIG. 1A.

As illustrated in FIG. 1A and FIG. 2, the stereoscopic image display device 210 includes a liquid crystal optical unit 110 (a liquid crystal optical apparatus), an image display unit 120, and a drive unit 130.

The image display unit 120 has a display surface 120a that displays an image. The display surface 120a has, for example, a rectangular configuration.

The liquid crystal optical unit 110 is provided on the display surface 120a. For example, the liquid crystal optical unit 110 covers the display surface 120a. The liquid crystal optical unit 110 functions as, for example, a liquid crystal GRIN lens (Gradient Index lens). The distribution of the refractive index of the liquid crystal optical unit 110 is changeable. One state of the distribution of the refractive index corresponds to a first state in which the image displayed on the display surface 120a is incident on the eyes of the human viewer as displayed on the display surface 120a. Another state of the refractive index distribution corresponds to a second state in which the image displayed on the image display unit 120 is incident on the eyes of the human viewer as multiple parallax images.

By causing the distribution of the refractive index of the liquid crystal optical unit 110 to change in the stereoscopic image display device 210, it is possible to selectively switch between a display of a two-dimensional image (called a 2D display hereinbelow) and a display of a three-dimensional image (called a 3D display hereinbelow) for which stereoscopic viewing is possible with the naked eyes.

The drive unit 130 is electrically connected to the liquid crystal optical unit 110. In this example, the drive unit 130 also is electrically connected to the image display unit 120. The drive unit 130 controls the operations of the liquid crystal optical unit 110 and the image display unit 120. For example, the drive unit 130 performs the switching between the first state and the second state of the liquid crystal optical unit 110. An image signal is input to the drive unit 130 by using a recording medium, an external input, etc. The drive unit 130 controls the operation of the image display unit 120 based on the image signal that is input. Thereby, an image corresponding to the image signal that is input is displayed on the display surface 120a. The drive unit 130 may be included in the image display unit 120.

In the case where the drive unit 130 performs the 2D display, the drive unit 130 switches the liquid crystal optical unit 110 to the first state and causes the image display unit 120 to display the image for the 2D display. On the other hand, in the case where the drive unit 130 performs the 3D display, the drive unit 130 switches the liquid crystal optical unit 110 to the second state and causes the image display unit 120 to display the image for the 3D display.

The liquid crystal optical unit 110 includes a first substrate unit 11s, a second substrate unit 12s, and a liquid crystal layer 30. The first substrate unit 11s includes a first substrate 11 and a first electrode 21. The second substrate unit 12s includes a second substrate 12 and a second electrode 22.

The first substrate 11 has a first major surface 11a. The second substrate 12 has a second major surface 12a opposing the first major surface 11a. The first electrode 21 is multiply provided on the first substrate 11. The first electrode 21 is multiply provided on the first major surface 11a. Each of the multiple first electrodes 21 extends along a first direction; and the multiple first electrodes 21 are arranged in a second direction perpendicular to the first direction with spacing between the multiple first electrodes 21. For example, the spacing between the multiple first electrodes 21 is constant.

A direction perpendicular to the first major surface 11a and the second major surface 12a is taken as a Z-axis direction. One direction perpendicular to the Z-axis direction is taken as an X-axis direction. A direction perpendicular to the Z-axis direction and the X-axis direction is taken as a Y-axis direction. In this example, the Y-axis direction is taken to be the first direction. The X-axis direction is taken to be the second direction. However, in the embodiments, the first direction may be any direction perpendicular to the Z-axis direction; and the first direction may be any direction along the first major surface 11a.

For example, the first electrode 21 has a substantially rectangular configuration when viewed in the Z-axis direction. The length of the first electrode 21 in the Y-axis direction is slightly longer than the length of the display surface 120a in the Y-axis direction. The first electrode 21 crosses the display surface 120a in the Y-axis direction.

The first major surface 11a is substantially parallel to the second major surface 12a. In this example, one side of two mutually perpendicular sides of the rectangular display surface 120a is parallel to the X-axis direction; and the other side is parallel to the Y-axis direction. The orientation of the sides of the display surface 120a is not limited thereto and may include any direction perpendicular to the Z-axis direction.

One end of each of the multiple first electrodes 21 is connected to an interconnect unit 41. The configuration including the multiple first electrodes 21 and the interconnect unit 41 is a comb-like configuration. A voltage can be applied to each of the multiple first electrodes 21 by applying the voltage to the interconnect unit 41.

The second substrate unit 12s opposes the first substrate unit 11s. The second major surface 12a of the second substrate 12 opposes the first major surface 11a. The second electrode 22 is provided on the second substrate 12. The second electrode 22 is provided on the second major surface 12a. The second electrode 22 opposes each of the multiple first electrodes 21. The second electrode 22 is larger than the first electrode 21 and covers the first electrode 21 when viewed in the Z-axis direction.

The multiple first electrodes 21 and the second electrode 22 are electrically connected to the drive unit 130 by not-illustrated interconnects. The application of the voltage (the setting of the potential) to the multiple first electrodes 21 and the second electrode 22 is controlled by the drive unit 130. The switching between the first state and the second state of the liquid crystal optical unit 110 is performed by applying the voltage to the multiple first electrodes 21 and the second electrode 22.

The liquid crystal layer 30 is provided between the first substrate unit 11s and the second substrate unit 12s. The liquid crystal layer 30 includes a liquid crystal material 36 that includes multiple liquid crystal molecules 35. The liquid crystal material 36 is a liquid crystal medium. The liquid crystal layer 30 may include, for example, a nematic liquid crystal. The dielectric anisotropy of the liquid crystal layer 30 is positive or negative. Hereinbelow, the case will be described where a nematic liquid crystal having a positive dielectric anisotropy is used as the liquid crystal layer 30.

A first alignment film 31 is provided between the first substrate unit 11s and the liquid crystal layer 30. The first alignment film 31 causes the liquid crystal molecules 35 to have a horizontal alignment (that is, parallel alignment). A second alignment film 32 is provided between the second substrate unit 12s and the liquid crystal layer 30. The second alignment film 32 causes the liquid crystal molecules 35 to have a horizontal alignment (that is, parallel alignment). The first alignment film 31 and the second alignment film 32 cause the director (the long axis) of the liquid crystal molecules 35 to be oriented in the X-axis direction. Thereby, the liquid crystal material 36 has the horizontal alignment in the state (the state illustrated in FIGS. 1A and 1B) in which the voltage is not applied to the multiple first electrodes 21 and the second electrode 22.

Herein, the horizontal alignment includes, for example, the state in which the long axis of the liquid crystal molecules 35 is within a range of not less than 0° and not more than 30° when the direction perpendicular to the Z-axis direction is taken to be 0°. In other words, the pretilt angle of the horizontal alignment is, for example, not less than 0° and not more than 30°. The liquid crystal layer 30 may have a vertical alignment or a hybrid alignment (HAN alignment).

The first substrate 11, the second substrate 12, the first electrode 21, and the second electrode 22 may include a transparent material. The light including the image which is displayed on the image display unit 120 passes through the first substrate 11, the second substrate 12, the first electrode 21, and the second electrode 22.

The first substrate 11 and the second substrate 12 may include, for example, glass, a resin, etc. The first electrode 21 and the second electrode 22 may include, for example, an oxide including at least one element selected from the group consisting of In, Sn, Zn, and Ti. The first electrode 21 and the second electrode 22 may include, for example, ITO. The first electrode 21 and the second electrode 22 may be, for example, at least one selected from $In_2O_3$ and $SnO_3$. The first electrode 21 and the second electrode 22 may be, for example, a thin metal layer.

The first alignment film 31 and the second alignment film 32 may include, for example, a resin such as polyimide. The film thicknesses of the first alignment film 31 and the second alignment film 32 are, for example, 200 nm (e.g., not less than 100 nm and not more than 300 nm). The interconnect unit 41 may include, for example, the material of the first electrode 21 and the second electrode 22.

As illustrated in FIG. 1B, each of the multiple first electrodes 21 includes a recess 40 in an opposing surface 21a (a first surface) which opposes the second electrode 22. The first substrate unit 11s includes an insulating layer 42 provided between the first substrate 11 and each of the multiple first electrodes 21. The insulating layer 42 is light-transmissive. The insulating layer 42 may include, for example, an inorganic material such as silicon oxide, an organic material such as an acrylic resin, a polyimide resin, etc. The material used to form the insulating layer 42 may be photosensitive.

The insulating layer 42 has a hole 42a in a portion opposing the first electrode 21. The hole 42a pierces the insulating layer 42 along the Z-axis direction. Or, the depth of the hole 42a may be shallower than the thickness of the insulating layer 42. The recess 40 conforms to the hole 42a. The recess 40 is formed by, for example, causing a portion of the first electrode 21 to enter the hole 42a. Thus, the recess 40 is, for example, a portion of the first electrode 21 that enters the hole 42a. The hole 42a has, for example, a rectangular configuration as viewed in the Z-axis direction. Accordingly, the recess 40 also has, for example, a rectangular configuration as viewed in the Z-axis direction.

Each of the multiple first electrodes 21 has multiple recesses 40 arranged along the Y-axis direction. For example, the multiple recesses 40 are juxtaposed in substantially one straight line configuration along the Y-axis direction. For example, the multiple recesses 40 are arranged periodically. For example, the multiple recesses 40 are arranged at substantially uniform spacing.

A distance D1 between two mutually adjacent (e.g., most proximal) recesses 40 is not more than a width W1 of the first electrode 21 in the X-axis direction. The multiple recesses 40 include a first recess 40p and a second recess 40q that is adjacent to the first recess 40p. The distance D1 between the first recess 40p and the second recess 40q is not more than the width W1 of the first electrode 21 in the X-axis direction. Widths W2 of two mutually adjacent (e.g., most proximal) recesses 40 are greater than the distance D1 from the recess 40 to the adjacent (e.g., the most proximal) recess 40. The width of the first recess 40p in the X-axis direction and the width of the second recess 40q in the X-axis direction are greater than the distance D1 between the first recess 40p and the second recess 40q. A depth D2 of the recess 40 from the opposing surface 21a is less than the width W1 of the first electrode 21 in the X-axis direction. The width W1 of the first electrode 21 in the X-axis direction is, for example, not less than 10 μm and not more than 100 μm. The depth D2 of the recess 40 from the opposing surface 21a is, for example, 1 μm (e.g., not less than 0.5 μm and not more than 2 μm).

The image display unit 120 includes multiple pixel groups 50 arranged in a two-dimensional matrix configuration. The display surface 120a is formed of the multiple pixel groups 50. The pixel group 50 includes, for example, a first pixel PX1, a second pixel PX2, and a third pixel PX3. Hereinbelow, the first pixel PX1 to the third pixel PX3 are collectively called the pixels PX. The pixel group 50 is disposed to oppose a region AR1 between two adjacent first electrodes 21. The first pixel PX1 to the third pixel PX3 included in the pixel group 50 are arranged in the X-axis direction. The number of multiple pixels PX included in the pixel group 50 is not limited to three and may be two, four, or more.

For example, the image display unit 120 emits the light including the image which is displayed on the display surface 120a. This light is in a linearly polarized light state travelling substantially in the Z-axis direction. The polarizing axis of the linearly polarized light (the orientation axis of the vibration plane of the electric field in the X-Y plane) is the X-axis direction. In other words, the polarizing axis of the linearly polarized light is in a direction parallel to the director (the long axis) of the liquid crystal molecules 35. For example, the linearly polarized light is formed by disposing an optical filter (a polarizer) having the X-axis direction as the polarizing axis in the optical path.

As illustrated in FIG. 1A, each of the multiple liquid crystal molecules 35 included in the liquid crystal layer 30 has horizontal alignment in the case where the voltage is not applied to the multiple first electrodes 21 and the second electrode 22.

Thereby, there is a substantially uniform refractive index distribution in the X-axis direction and the Y-axis direction. Therefore, in the case where the voltage is not applied, the travel direction of the light including the image which is displayed on the image display unit 120 is substantially unchanged. In the case where the voltage is not applied, the liquid crystal optical unit 110 is switched to the first state.

In the case where the liquid crystal optical unit 110 is switched from the first state to the second state, for example, the voltage is applied between the second electrode 22 and the multiple first electrodes 21.

Figure 3A:
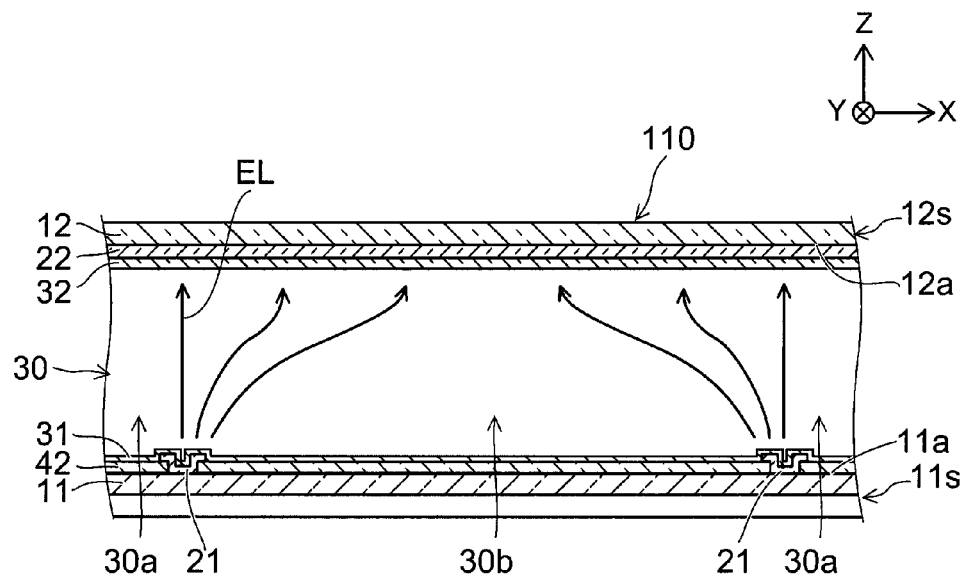
FIG. 3A and FIG. 3B are schematic cross-sectional views illustrating the configuration of a portion of the stereoscopic image display device according to the first embodiment.
Figure 3B:
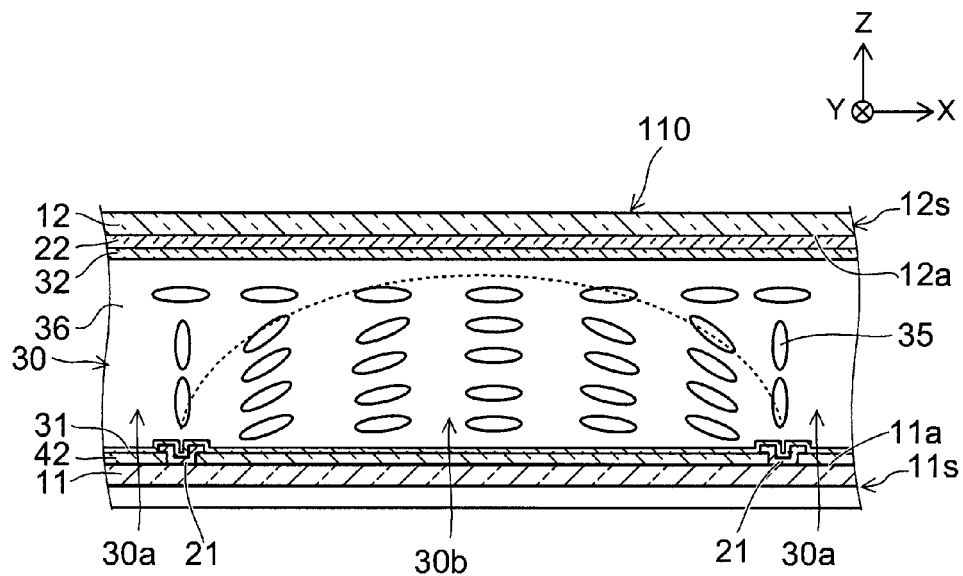

FIG. 3A and FIG. 3B are schematic cross-sectional views illustrating the configuration of a portion of the stereoscopic image display device according to the first embodiment.

As illustrated in FIG. 3A, lines of electric force EL from the first electrodes 21 toward the second electrode 22 are generated when the voltage is applied to the multiple first electrodes 21 and the second electrodes 22. For example, the lines of electric force EL have a horizontally symmetric distribution centered on the first electrode 21.

FIG. 3B is a model-like illustration of the alignment of the liquid crystal molecules 35 of the liquid crystal layer 30. As illustrated in FIG. 3B, the alignment of the liquid crystal molecules 35 deforms along the paths of the lines of electric force EL in the dense region (i.e., the strong electric field region) of the lines of electric force EL in the case where the dielectric anisotropy of the liquid crystal layer 30 is positive. The tilt angle of the liquid crystal molecules 35 increases in a first portion 30a of the liquid crystal layer 30 where the first electrode 21 opposes the second electrode 22. On the other hand, the liquid crystal molecules 35 in a second portion 30b of the liquid crystal layer 30 proximal to the center of the two adjacent first electrodes 21 remain in the horizontal alignment. The angle (the tilt angle) of the liquid crystal molecules 35 in the portion between the first portion 30a and the second portion 30b changes gradually toward the vertical alignment from the second portion 30b toward the first portion 30a. The angle of the long axis of the liquid crystal molecules 35 changes in the Z-X plane along the lines of electric force EL. The angle of the long axis of the liquid crystal molecules 35 changes with the Y axis as a rotational axis.

The liquid crystal molecules 35 are birefringent. The refractive index with respect to the polarization of the long-axis direction of the liquid crystal molecules 35 is higher than the refractive index with respect to the polarization of the short-axis direction of the liquid crystal molecules 35. As recited above, when the angle of the liquid crystal molecules 35 is changed, the refractive index of the liquid crystal layer 30 with respect to the linearly polarized light travelling in the Z-axis direction with the polarizing axis oriented in the X-axis direction is high in the second portion 30b of the liquid crystal layer 30 and gradually decreases toward the first portion 30a. Thereby, the refractive index distribution is formed in a convex lens configuration.

The multiple first electrodes 21 extend along the Y-axis direction. Therefore, the refractive index distribution of the liquid crystal layer 30 has a cylindrical lens configuration extending along the Y-axis direction during the voltage application. The multiple first electrodes 21 are arranged along the X-axis direction. Therefore, the refractive index distribution of the liquid crystal layer 30 during the voltage application has a lenticular lens configuration in which cylindrical lenses extending along the Y-axis direction are multiply arranged in the X-axis direction when the liquid crystal layer 30 is viewed as an entirety.

The pixel group 50 of the image display unit 120 is disposed to oppose the region AR1 between the two adjacent first electrodes 21. The refractive index distribution having the convex lens configuration that is formed in the liquid crystal layer 30 opposes the pixel group 50. In the refractive index distribution of the liquid crystal layer 30 of this example, the portion (the second portion 30b) where the refractive index is high opposes the second pixel PX2 disposed in the center of the pixel group 50.

The refractive index distribution of the liquid crystal layer 30 during the voltage application causes the light (the image) emitted from the pixel group 50 to travel toward the eyes of the human viewer. Thereby, the image formed of the multiple first pixels PX1 included in the display surface 120a becomes a first parallax image. The image formed of the multiple second pixels PX2 becomes a second parallax image. The image formed of the multiple third pixels PX3 becomes a third parallax image. The parallax image for the right eye is selectively incident on the right eye of the human viewer; and the parallax image for the left eye is selectively incident on the left eye of the human viewer. Thereby, a 3D display is possible. In other words, in the case where the voltage is applied to the multiple first electrodes 21 and the second electrode 22, the liquid crystal optical unit 110 is switched to the second state.

In the case where the liquid crystal optical unit 110 is in the first state, the light emitted from the pixel group 50 travels straight and is incident on the eyes of the human viewer. Thereby, a 2D display is possible. In the 2D display, a normal 2D image can be displayed with a resolution greater than that of the 3D display by a factor of the number of parallax images (in this example, three times).

Color filters including the three primary colors RGB may be provided respectively at the multiple pixels PX. Thereby, a color display is possible. Other than the three primary colors RGB, the color filters may further include white (colorless) and other color components.

Thus, the liquid crystal optical unit 110 of the stereoscopic image display device 210 switches between the 2D display and the 3D display by changing the refractive index distribution of the liquid crystal layer 30 by whether or not the voltage is applied to the multiple first electrodes 21 and the second electrode 22. In the liquid crystal optical unit 110, the multiple recesses 40 are provided in the opposing surface 21a of the first electrode 21.

When switching from the first state to the second state in the liquid crystal optical unit 110, the direction of the director of the liquid crystal changes from the horizontal alignment toward the vertical alignment. At this time, at least one selected from reverse tilt (reversal of the tilt direction of the liquid crystal) and twist (rotation of the director of the liquid crystal in the X-Y plane) occurs; and disclinations occur. It was found that this causes the optical characteristics of the liquid crystal optical unit to degrade.

Such a disclination is in an unstable state energy-wise because the disclination is formed at the boundary between alignment domains having different tilt angles and/or twist angles due to a balance between the alignment states of the alignment domains. Then, when some stimulus occurs, the disclination easily changes. For example, bending occurs along the extension direction of the electrode at a pitch that is several times the electrode width; and the width of the disclination region is several or more times that of the case where the bending does not occur. In this state in which the bending markedly occurs, the effect of the disclination region on the optical characteristic degradation of the liquid crystal optical unit greatly increases. It is considered that this is because the width of the disclination region is several or more times greater due to the occurrence of the bending.

Conversely, the inventors diligently performed investigations of the mechanism of the bend occurrence of disclinations and discovered that the bending of the disclinations can be controlled by providing the multiple recesses 40 in the multiple first electrodes 21. By providing the multiple recesses 40 in or around the first electrode 21, and particularly in the regions reached by the disclinations due to the disclination bending, the bending of the disclinations can be deliberately caused to occur with the recesses 40 as starting points. Then, by performing a prescribed method for the disposition of the recesses 40, the width of the bending of the disclinations can be small. Thereby, it is possible to suppress the increase of the effect of the disclinations due to bending.

In the stereoscopic image display device 210, the occurrence of disclinations and the bending of the disclinations causes crosstalk of the parallax images and impedes the stereoscopic viewing of the human viewer. In the stereoscopic image display device 210, the occurrence of disclinations can be suppressed; and the ease of viewing the stereoscopic image display device 210 can be improved.

In the stereoscopic image display device 210, the distance D1 between two mutually-adjacent recesses 40 is not more than the width W1 of the first electrode 21 in the X-axis direction. Thereby, the width of the bending of the disclination can be the width W1 of the first electrode 21 in the X-axis direction or less; the effect of the bending can be suppressed; and the ease of viewing the stereoscopic image display device 210 can be drastically improved. In the stereoscopic image display device 210, the widths W2 of the recesses 40 are greater than the distance D1 from the recess 40 to the adjacent recess 40. Thereby, the recess 40 can be an effective starting point of the bending of the disclination; and the controllability of the bending can be improved. In the stereoscopic image display device 210, the width W1 of the first electrode 21 in the X-axis direction is greater than the depth D2 of the recess 40 from the opposing surface 21a. Thereby, the disclination bending controllability of the recess 40 can be improved further. This is because the width of the recess 40 is more effective than the depth for controlling the disclinations.

FIG. 4A to FIG. 4E are schematic perspective views illustrating the configuration of a portion of another stereoscopic image display device according to the first embodiment.

As illustrated in FIG. 4A, for two mutually-adjacent recesses 40 of the multiple recesses 40 provided in the first electrode 21, the X-axis direction position of one recess 40 may be different from the X-axis direction position of (the adjacent) recess 40 adjacent to the one recess 40. The X-axis direction position of the X-axis direction center of the first recess 40p may be different from the X-axis direction position of the X-axis direction center of the second recess 40q. In other words, the X-axis direction positions of two mutually-adjacent recesses 40 may be relatively shifted. This is not limited to two adjacent recesses 40; and the X-axis direction position may be shifted, for example, every few recesses 40. Thus, the controllability of the bending of the disclinations can be improved further by a shifted disposition. In other words, by suppressing the phenomenon of the position of the disclination moving away from the recess 40, the bending of the disclination can be controlled to be at the desired positions.

As illustrated in FIG. 4B, one recess 40 may be provided in the first electrode 21 in a line configuration extending along the Y-axis direction. FIG. 4B illustrates a recess 40 having a straight line configuration.

As illustrated in FIG. 4C, the X-axis direction width of the recess 40 having the line configuration may be changed. For example, FIG. 4C illustrates a recess 40 in which the X-axis direction width gradually widens from the end portion on the side connected to the interconnect unit 41 toward the end portion on the opposite side. The width of the recess 40 in the X-axis direction may gradually narrow from the end portion on the side connected to the interconnect unit 41 toward the end portion on the opposite side. Or, the Y-axis direction width may be widest around the central portion and may gradually narrow toward both ends. In FIG. 4C, the X-axis direction width changes continuously from one end side toward the other end. The width of the recess 40 in the X-axis direction may change in stages.

As illustrated in FIG. 4D, the line configuration of the recess 40 may be a zigzag configuration including multiple bends 40a where the angle with respect to the Y-axis direction changes. In the recess 40 of FIG. 4D, a Y-axis direction distance D3 between two mutually-adjacent bends 40a is not more than the width W1 of the first electrode 21 in the X-axis direction. As described above, because the disclination originally and naturally tends to bend, the positions of the bending of the disclination can be controlled best by finely pre-bending the recess 40 having the line configuration. For example, the line configuration of the recess 40 may be curved in a waveform.

As illustrated in FIG. 4E, two recesses 40 having line configurations may be provided in the first electrode 21 and arranged in the X-axis direction. The number of the recesses 40 having the line configurations is not limited to two, and may be three or more. In other words, the multiple recesses 40 having the line configurations may be provided in the first electrode 21 and arranged in the X-axis direction. The line configurations of the multiple recesses 40 may be straight line configurations or zigzag configurations. The X-axis direction width of each of the multiple recesses 40 having the line configurations may change.

For example, the recess 40 may be made by a configuration such as a hole provided in the first substrate 11 being transferred onto the first electrode 21. Also, for example, the recess 40 may be a hole, a trench, a slit, etc., made in the first electrode 21 itself.

Second Embodiment

Figure 5:
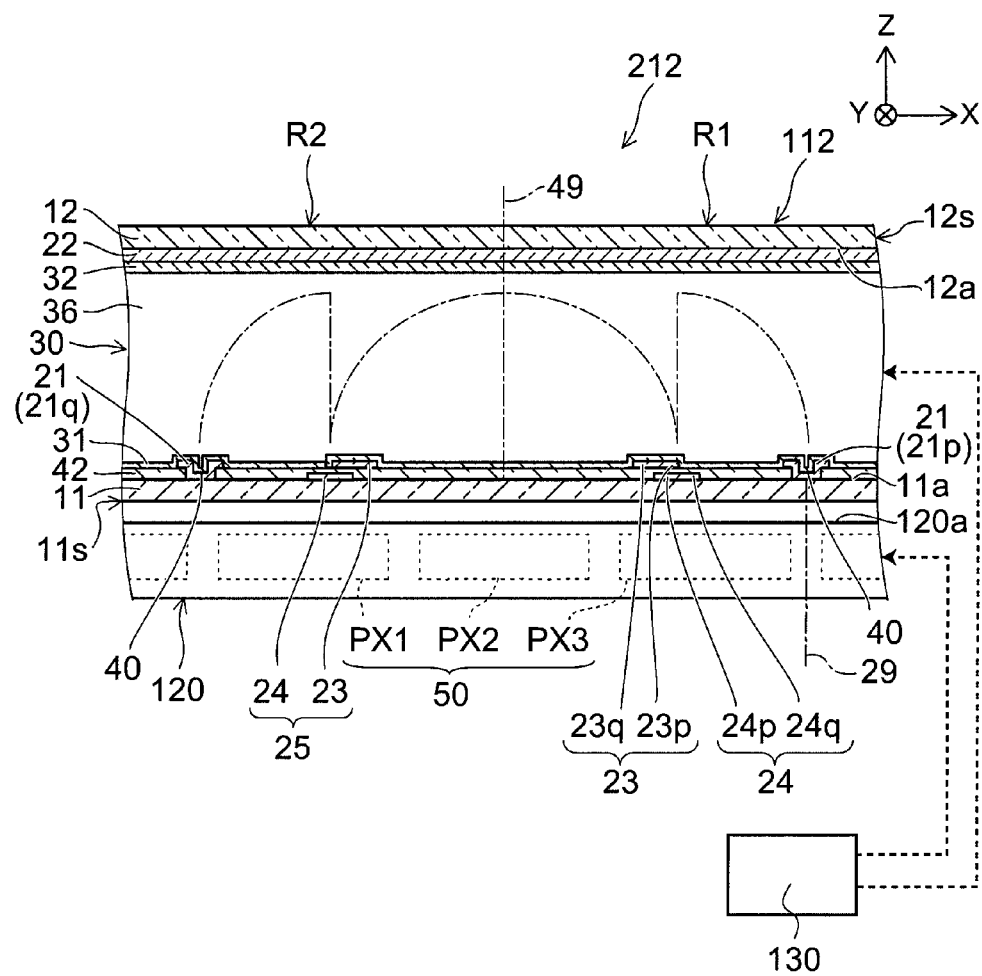
FIG. 5 is a schematic cross-sectional view illustrating the configuration of a stereoscopic image display device according to a second embodiment.

FIG. 5 is a schematic cross-sectional view illustrating the configuration of a stereoscopic image display device according to a second embodiment.

In a stereoscopic image display device 212 of this example as illustrated in FIG. 5, the first substrate unit 11s of a liquid crystal optical unit 112 further includes multiple electrode pairs 25. Each of the multiple electrode pairs 25 is provided on the first major surface 11a. The multiple electrode pairs 25 are arranged in the second direction (the X-axis direction). The multiple electrode pairs 25 are respectively disposed in the spaces between the multiple first electrodes 21. The multiple electrode pairs 25 are respectively provided in the spaces between the multiple first electrodes 21 on the first major surface 11a. The recess 40 is provided in the multiple first electrodes 21.

Each of the multiple electrode pairs 25 includes a third electrode 23 and a fourth electrode 24. The third electrode 23 extends in the Y-axis direction (the first direction). The fourth electrode 24 extends in the Y-axis direction. In the liquid crystal optical unit 112, the insulating layer 42 is provided between the first substrate 11 and the first electrode 21 and between the third electrode 23 and the fourth electrode 24. The insulating layer 42 is provided between the third electrode 23 and the fourth electrode 24. The insulating layer 42 may be continuous between the multiple electrode pairs 25. In this example, the insulating layer 42 extends between the first electrode 21 and the first substrate 11.

FIG. 5 illustrates two of the multiple first electrodes 21. The number of the multiple first electrodes 21 is arbitrary.

Two most proximal first electrodes 21 of the multiple first electrodes 21 will now be focused upon. A central axis 49 is between the most proximal first electrodes 21. The central axis 49 passes through the midpoint of a line connecting the X-axis direction centers of the two most proximal first electrodes 21. The central axis 49 is parallel to the Y-axis direction.

An electrode 21$p$ which is one of the two most proximal first electrodes 21 will now be focused upon. A position 29 of the electrode 21$p$ is the center position of the electrode 21$p$ in the X-axis direction.

The region of the first major surface 11$a$ between the central axis 49 and the electrode 21$p$ which is the one of the two most proximal first electrodes 21 is taken as a first region R1. The region of the first major surface 11$a$ between the central axis 49 and an electrode 21$q$ which is the other of the two most proximal first electrodes 21 is taken as a second region R2. The direction from the central axis 49 toward the electrode 21$p$ is taken as the +X direction. The direction from the central axis 49 toward the electrode 21$q$ corresponds to the −X direction.

In this example, one electrode pair 25 is provided in the first region R1. Also, one other electrode pair 25 is provided in the second region R2. The multiple electrode pairs 25 are separated from each other when projected onto the X-Y plane. A region where electrodes are not provided exists between the electrode pairs 25. In the embodiment, other electrodes may be further provided between the electrode pairs 25.

In the one electrode pair 25, the third electrode 23 includes a first superimposed portion 23$p$ overlaying the fourth electrode 24 and a first non-superimposed portion 23$q$ not overlaying the fourth electrode 24 when projected onto a plane (the X-Y plane) parallel to the first direction and the second direction. In the one electrode pair 25, the fourth electrode 24 includes a second superimposed portion 24$p$ overlaying the third electrode 23 and a second non-superimposed portion 24$q$ not overlaying the third electrode 23 when projected onto the X-Y plane.

In the electrode pair 25 included in the first region R1 of the liquid crystal optical unit 112, the first superimposed portion 23$p$ is disposed between the second superimposed portion 24$p$ and the liquid crystal layer 30. The position of the third electrode 23 is shifted in the X-axis direction from the position of the fourth electrode 24. Specifically, in the one electrode pair 25, the distance between the second non-superimposed portion 24$q$ and the central axis 49 is longer than the distance between the first non-superimposed portion 23$q$ and the central axis 49. In other words, in the one electrode pair 25, the third electrode 23 is more proximal to the central axis 49 than is the fourth electrode 24.

The disposition of the electrode pair 25 in the second region R2 substantially has line symmetry with the central axis 49 as the axis of symmetry. However, the line symmetry may not be rigorous. For example, a micro asymmetry may be introduced based on the distribution of the arrangement (e.g., the pretilt angle, etc.) of the liquid crystal layer 30.

In the case where the liquid crystal optical unit 112 is switched from the first state to the second state, the drive unit 130 applies, for example, a first voltage between the first electrode 21 and the second electrode 22, a third voltage between the third electrode 23 and the second electrode 22, and a fourth voltage between the fourth electrode 24 and the second electrode 22. For convenience herein, even in the case where the potential difference between the electrodes is zero, this is described as a voltage (a voltage of 0 volts) being applied. The absolute value of the first voltage is larger than the absolute value of the third voltage. The absolute value of the first voltage is larger than the absolute value of the fourth voltage. The absolute value of the third voltage is larger than the absolute value of the fourth voltage. In the case where these voltages are alternating current, the effective value (for example, root-mean-square value) of the first voltage is greater than the effective value of the third voltage. The effective value of the first voltage is greater than the effective value of the fourth voltage. The effective value of the third voltage is greater than the effective value of the fourth voltage. For example, the effective value of the first voltage may be set to be greater than the effective value of the fourth voltage.

When the voltage is applied as recited above, the alignment of the liquid crystal molecules 35 that was the horizontal alignment approaches the vertical alignment in the portion of the liquid crystal layer 30 where the first electrode 21 opposes the second electrode 22. The liquid crystal molecules 35 remain in the horizontal alignment in the portion of the liquid crystal layer 30 proximal to the center of the two adjacent first electrodes 21. The alignment of the liquid crystal molecules 35 that was the horizontal alignment approaches the vertical alignment in the portion of the liquid crystal layer 30 where the second electrode 22 opposes the third electrode 23. The liquid crystal molecules 35 remain in the horizontal alignment in the portion of the liquid crystal layer 30 where the second electrode 22 opposes the second non-superimposed portion 24$q$ of the fourth electrode 24.

The refractive index gradually increases from the first electrode 21 toward the fourth electrode 24 in the portion between the first electrode 21 and the fourth electrode 24. The refractive index abruptly decreases from the fourth electrode 24 toward the third electrode 23 proximal to the boundary between the second non-superimposed portion 24$q$ and the first superimposed portion 23$p$. The refractive index gradually increases from the third electrode 23 toward the central axis 49 in the portion between the third electrode 23 and the central axis 49. Accordingly, when the voltage is applied as recited above, the liquid crystal layer 30 has a refractive index distribution having a Fresnel lens-like configuration in which the refractive index has a jump at the portion where the second electrode 22 opposes the electrode pair 25.

For the liquid crystal optical unit 112 in which the refractive index distribution having the Fresnel lens-like configuration is formed in the liquid crystal layer 30, the thickness of the liquid crystal layer 30 can be thinner than that of the liquid crystal optical unit 110. The response rate of the liquid crystal layer 30 when switching between the first state and the second state can be increased.

In the liquid crystal optical unit 112, the occurrence of the bending of the disclinations can be suppressed by providing the recess 40 in the first electrode 21 to which a large absolute value (a large effective value) is applied. Accordingly, good optical characteristics are obtained in the liquid crystal optical unit 112 as well.

Figure 6:
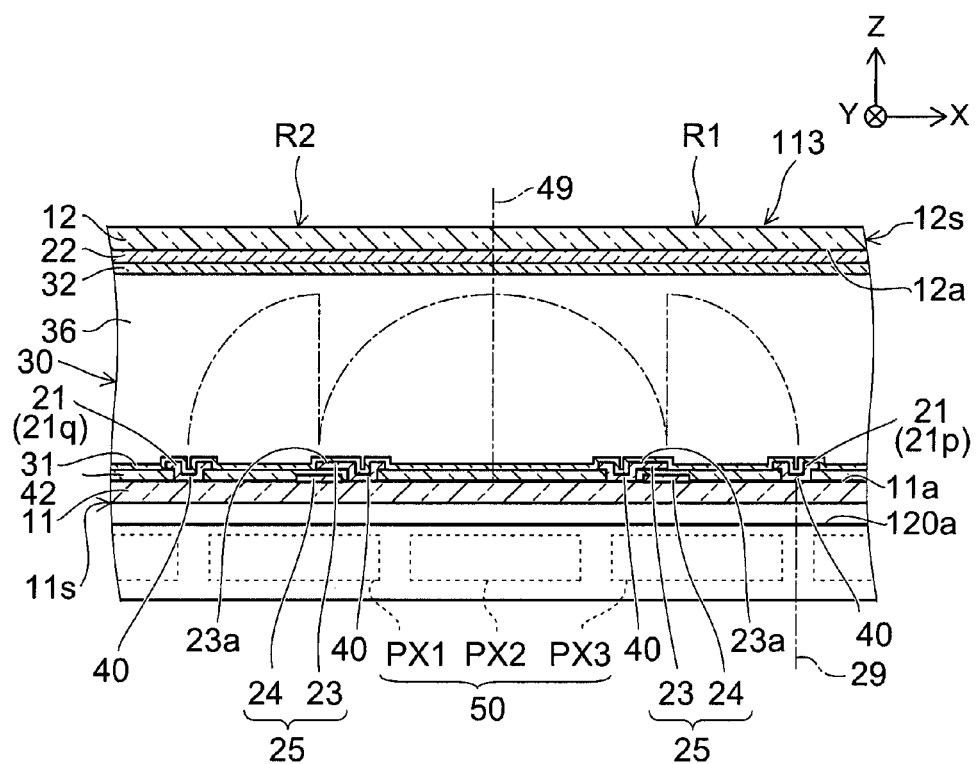
FIG. 6 is a schematic cross-sectional view illustrating the configuration of a portion of another stereoscopic image display device according to the second embodiment.

FIG. 6 is a schematic cross-sectional view illustrating the configuration of a portion of another stereoscopic image display device according to the second embodiment.

In a liquid crystal optical unit 113 as illustrated in FIG. 6, the recess 40 is provided in the third electrode 23. Thus, the recess 40 may be provided in the third electrode 23 to which a large absolute value (a large effective value) is applied. The third electrode 23 has an opposing surface 23$a$ (a second surface) opposing the second electrode 22. The third electrode 23 has the recess 40 provided in the opposing surface 23a. The third electrode 23 may be a portion of the first electrode 21. In other words, at least one of the first electrodes 21 may have a first superimposed portion overlaying the fourth electrode 24 and a first non-superimposed portion not overlaying the fourth electrode 24 when projected onto the plane parallel to the first direction and the second direction; and the fourth electrode 24 may have a second superimposed portion overlaying the first electrode 21 and a second non-superimposed portion not overlaying the first electrode 21 when projected onto the plane. For example, the third electrode 23 may be a portion of the first electrode 21; and a protrusion 46 may be provided in only the third electrode 23. For example, the third electrode 23 may be a portion of the first electrode 21; and the recess 40 may be provided in only the third electrode 23.

Third Embodiment

Figure 7:
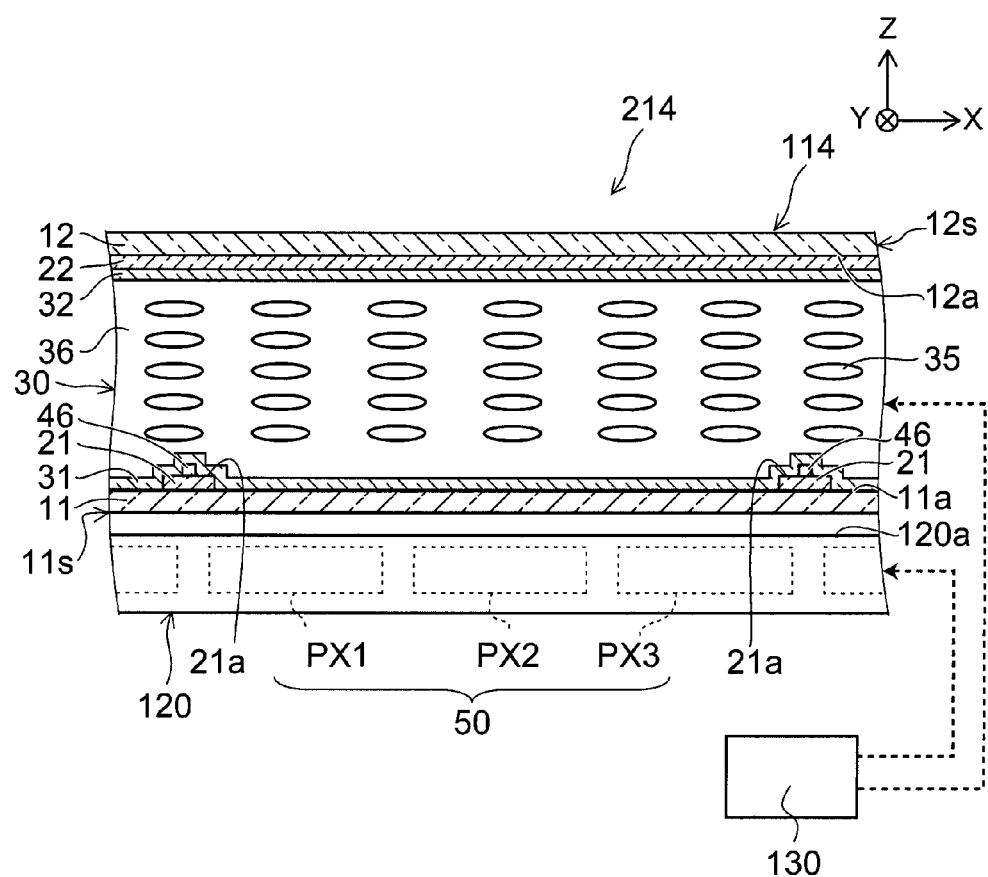
FIG. 7 is a schematic cross-sectional view illustrating the configuration of a stereoscopic image display device according to a third embodiment.

FIG. 7 is a schematic cross-sectional view illustrating the configuration of a stereoscopic image display device according to a third embodiment.

Figure 8:
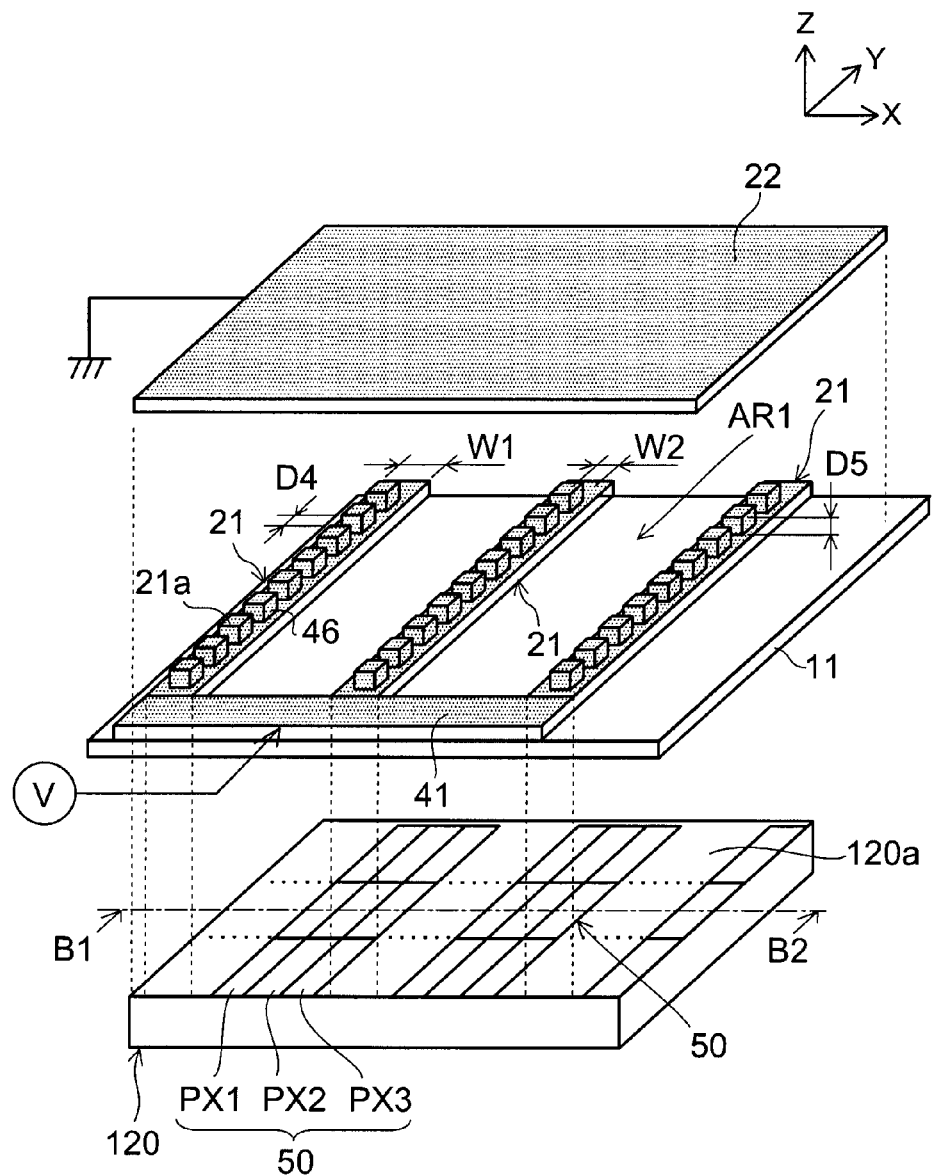
FIG. 8 is a schematic perspective view illustrating the configuration of a portion of the stereoscopic image display device according to the third embodiment.

FIG. 8 is a schematic perspective view illustrating the configuration of a portion of the stereoscopic image display device according to the third embodiment.

FIG. 7 schematically illustrates the cross section along line B1-B2 of FIG. 8. In the stereoscopic image display device 214 of this example as illustrated in FIG. 7 and FIG. 8, each of the multiple first electrodes 21 of a liquid crystal optical unit 114 includes the protrusion 46 on the opposing surface 21a which opposes the second electrode 22.

Each of the multiple first electrodes 21 includes multiple protrusions 46 arranged along the Y-axis direction. Each of the multiple protrusions 46 has substantially the same configuration. For example, the multiple protrusions 46 have rectangular parallelepiped configurations. For example, the multiple protrusions 46 are arranged in substantially one straight line configuration along the Y-axis direction. For example, the multiple protrusions 46 are arranged periodically. For example, the multiple protrusions 46 are arranged at substantially equal spacing. The multiple protrusions 46 may include, for example, an insulative material. The multiple protrusions 46 may include, for example, a resin material. The protrusion 46 may include, for example, an inorganic material such as silicon oxide, an organic material such as an acrylic resin, a polyimide resin, etc. The material used to form the protrusion 46 may be photosensitive.

A distance D4 between two mutually-adjacent protrusions 46 is not more than the width W1 of the first electrode 21 in the X-axis direction. Widths W3 of the two mutually-adjacent protrusions 46 are larger than the distance D4 from the protrusion 46 to the adjacent protrusion 46. A height D5 of the protrusion 46 from the opposing surface 21a is less than the width W1 of the first electrode 21 in the X-axis direction. The height D5 of the protrusion 46 from the opposing surface 21a is, for example, 1 μm (e.g., not less than 0.5 μm and not more than 2 μm).

Thus, even in the case where the protrusion 46 is provided in the opposing surface 21a, the occurrence of the bending of the disclinations can be suppressed similarly to the case of the recess 40. For example, the protrusion 46 may be a protrusion formed on the first electrode 21 itself. Both the recess 40 and the protrusion 46 may be provided in the opposing surface 21a. In other words, a configuration may be used in which multiple first electrodes 21 include at least one selected from the recess 40 and the protrusion 46 in the opposing surface 21a which opposes the second electrode 22.

For example, the multiple protrusions 46 may include a coloring material (e.g., a color resist containing at least one selected from a dye and a pigment). For example, the multiple protrusions 46 may be blue. For example, the transmittance of the multiple protrusions 46 in the wavelength region not less than 450 nm and not more than 485 nm may be higher than the transmittances in the wavelength regions less than 450 nm and greater than 485 nm. The first electrode 21 may have a yellowish tint. There are cases where the alignment film also has a yellowish tint. In the case where the multiple protrusions 46 are blue, the light passing through the first electrode 21 and the protrusion 46 can approach white. Thereby, color compensation of the stereoscopic image display device 214 can be performed.

The multiple protrusions 46 may be black and may reduce the transmittance. For example, the transmittance of the multiple protrusions 46 is less than the transmittance of the first electrode 21. Thereby, the effect of the disclinations can be reduced by reducing the transmittance of the protrusion 46.

FIG. 9A to FIG. 9E are schematic perspective views illustrating configurations of portions of other stereoscopic image display devices according to the third embodiment.

Figures 9A, 9B:
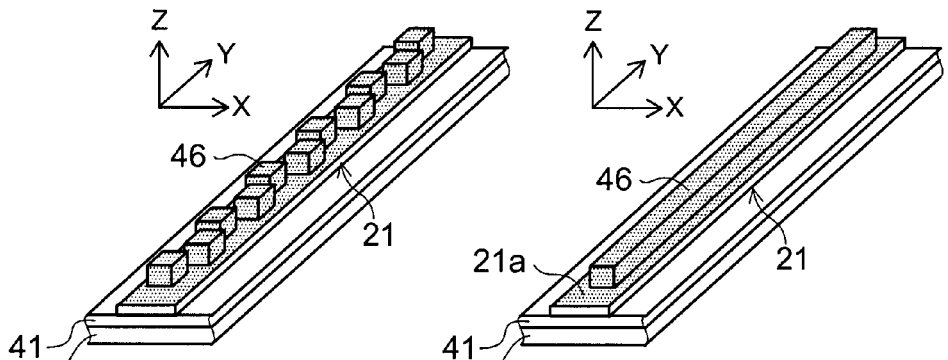
FIG. 9A to FIG. 9E are schematic perspective views illustrating configurations of portions of other stereoscopic image display devices according to the third embodiment.
Figures 9C, 9D:
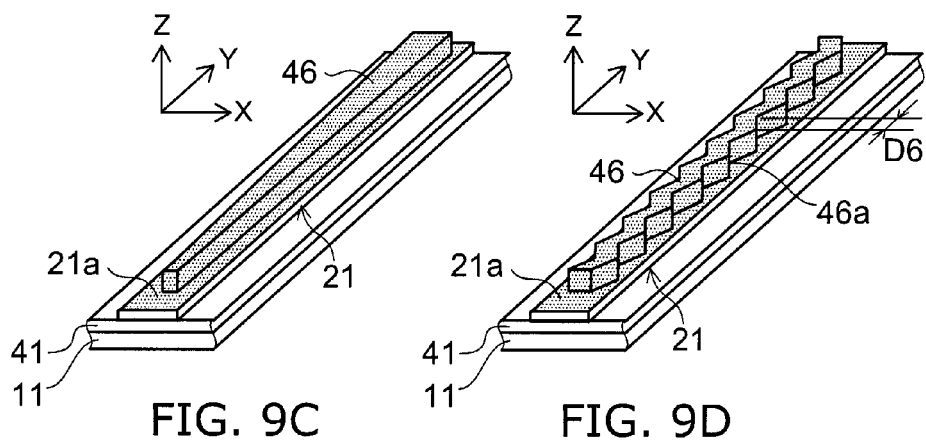

Similarly to the recess 40 as illustrated in FIG. 9A, the X-axis direction positions of the multiple protrusions 46 provided in the first electrode 21 may be different from each other. As illustrated in FIG. 9B, one protrusion 46 having a straight line configuration extending along the Y-axis direction may be provided on the first electrode 21. As illustrated in FIG. 9C, the X-axis direction width of the protrusion 46 having the line configuration may change. Similarly to the recess 40, the direction of the change of the X-axis direction width of the protrusion 46 is arbitrary. The change of the X-axis direction width of the protrusion 46 may be continuous or in stages.

As illustrated in FIG. 9D, the line configuration of the protrusion 46 may be a zigzag configuration including multiple bends 46a where the angle with respect to the Y-axis direction changes.

In the protrusion 46 of FIG. 9D, a Y-axis direction distance D6 between two adjacent bends 46a is not more than the width W1 of the first electrode 21 in the X-axis direction. Thereby, even in the case of a protruding configuration, the bending of the disclinations can be controlled well. For example, the line configuration of the protrusion 46 may be curved in a waveform.

Figure 9E:
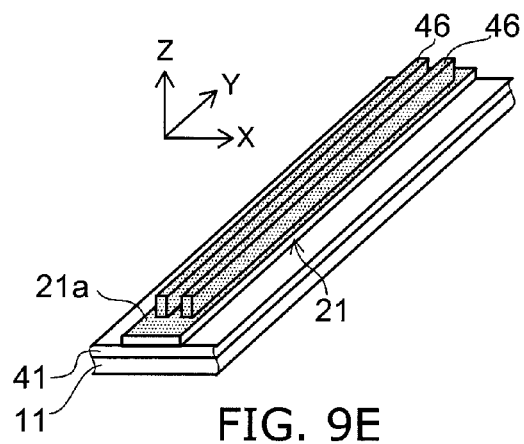

As illustrated in FIG. 9E, two protrusions 46 having line configurations may be provided in the first electrode 21 and arranged in the X-axis direction. The number of the protrusions 46 having the line configurations is not limited to two, and may be three or more. In other words, multiple protrusions 46 having line configurations may be provided in the first electrode 21 and arranged in the X-axis direction. The line configurations of the multiple protrusions 46 may be straight line configurations or zigzag configurations. The X-axis direction width of each of the protrusions 46 having the line configurations may change.

Figure 10:
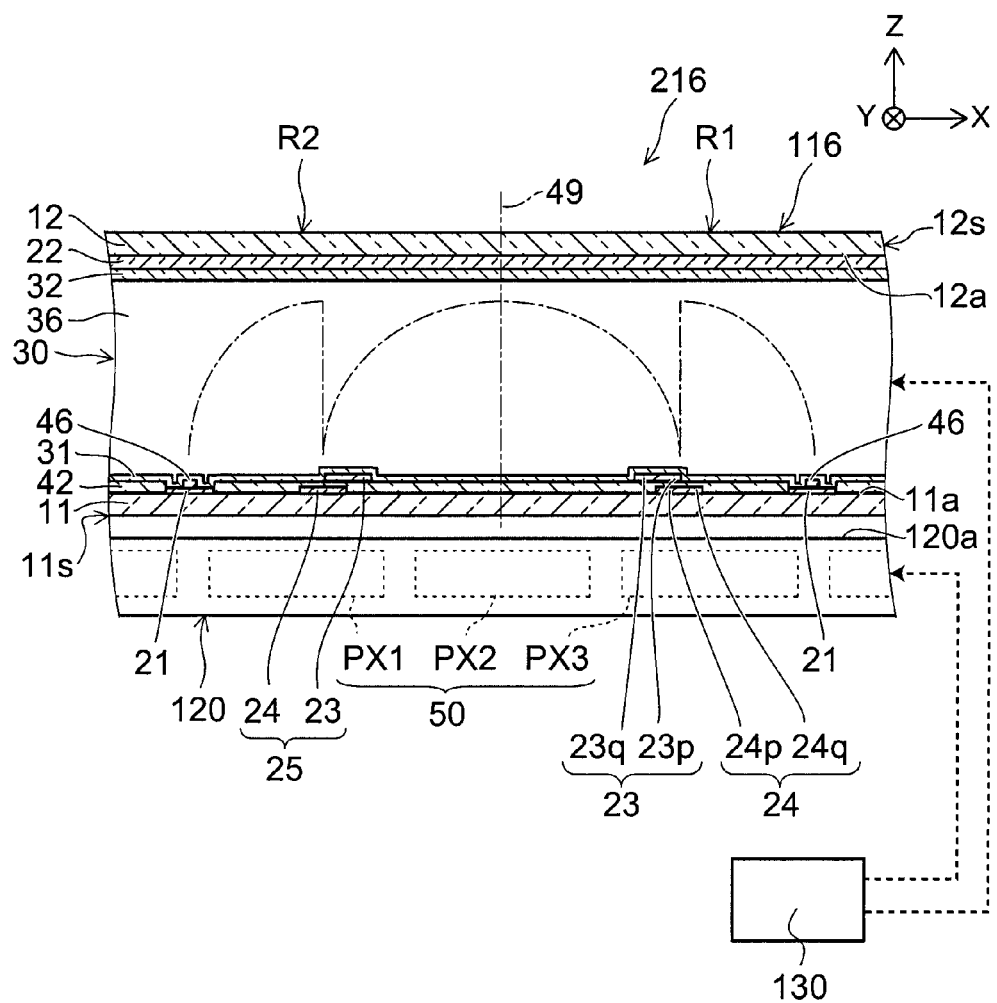
FIG. 10 is a schematic cross-sectional view illustrating the configuration of another stereoscopic image display device according to the third embodiment.

FIG. 10 is a schematic cross-sectional view illustrating the configuration of another stereoscopic image display device according to the third embodiment.

In a liquid crystal optical unit 116 of the stereoscopic image display device 216 in which the liquid crystal layer 30 has a refractive index distribution having a Fresnel lens-like configuration as illustrated in FIG. 10, the multiple first electrodes 21 are provided on the first substrate 11. The insulating layer 42 that insulates the third electrode 23 from the fourth electrode 24 is provided on the first electrode 21. Then, the protrusion 46 is formed from the insulating layer 42 by patterning the insulating layer 42 to leave a portion of the insulating layer 42 on the first electrode 21. Thus, the protrusion 46 may be formed by patterning the insulating layer 42 provided between the third electrode 23 and the fourth electrode 24. In other words, the protrusion 46 includes substantially the same material as the insulating layer 42. Thereby, the processes can be simplified.

Figure 11:
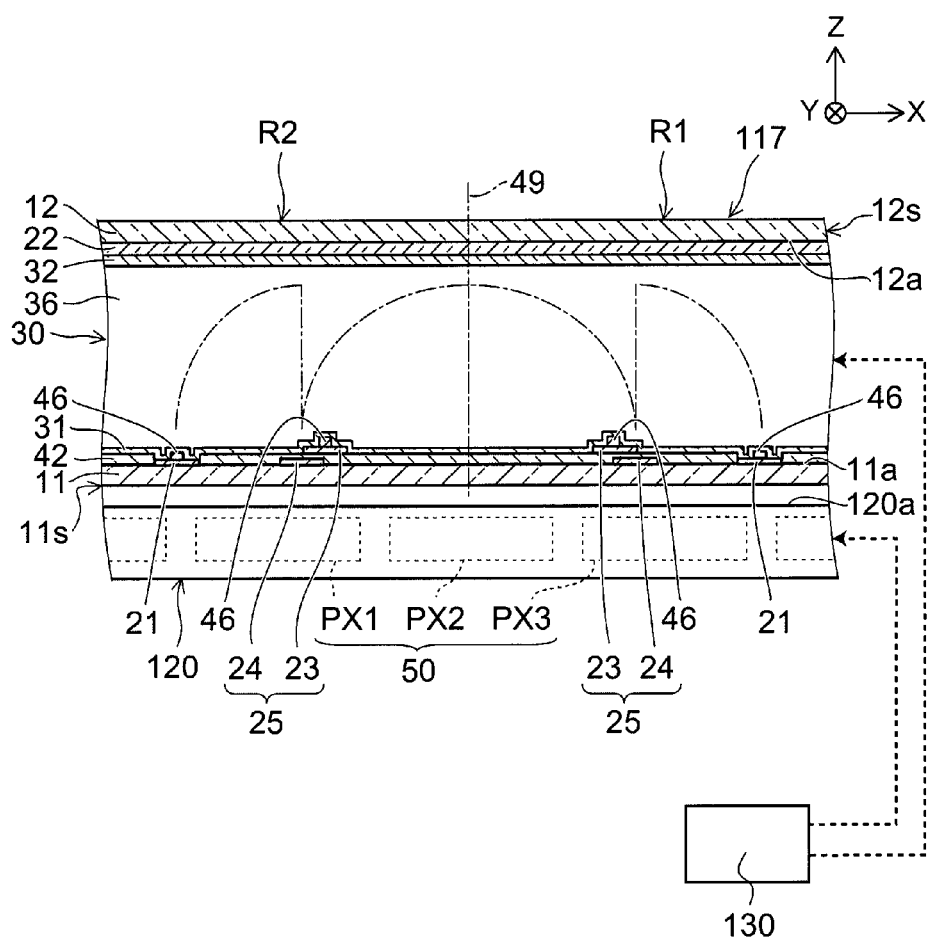
FIG. 11 is a schematic cross-sectional view illustrating the configuration of a portion of another stereoscopic image display device according to the third embodiment.

FIG. 11 is a schematic cross-sectional view illustrating the configuration of a portion of another stereoscopic image display device according to the third embodiment.

In a liquid crystal optical unit 117 as illustrated in FIG. 11, the protrusion 46 is provided on the third electrode 23. Thus, the protrusion 46 may be provided on the third electrode 23 to which a large absolute value (a large effective value) is applied. The third electrode 23 may be a portion of the first electrode 21. The protrusion 46 of the third electrode 23 may include, for example, a resin material, etc. The protrusion 46 of the third electrode 23 may be formed separately from the insulating layer 42.

According to the embodiments, a liquid crystal optical apparatus having good optical characteristics and a stereoscopic image display device including the liquid crystal optical unit are provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in liquid crystal optical apparatus and stereoscopic image display devices such as first substrate units, second substrate units, liquid crystal layers, first substrates, first electrodes, second substrates, second electrodes, electrode pairs, third electrodes, fourth electrodes, insulating layers, image display units, and the like from known art; and such practice is included in the scope of the invention to the extent that similar effects are obtained.

Further, any two or more components of the specific examples may be combined within the extent of technical feasibility and are included in the scope of the invention to the extent that the purport of the invention is included.

Moreover, all liquid crystal optical apparatuses and stereoscopic image display devices practicable by an appropriate design modification by one skilled in the art based on the liquid crystal optical apparatuses and the stereoscopic image display devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A liquid crystal optical apparatus, comprising:
   a first substrate unit including
      a first substrate, and
      a plurality of first electrodes provided on the first substrate to extend along a first direction, the first electrodes being arranged in a second direction perpendicular to the first direction;
   a second substrate unit including
      a second substrate opposing the first substrate, and
      a second electrode provided on the second substrate to oppose the first electrodes; and
   a liquid crystal layer provided between the first substrate unit and the second substrate unit,
   at least one of the first electrodes being provided with a plurality of recesses formed on a surface of the at least one of the first electrodes, the surface opposing the second electrode, the recesses being arranged along the first direction.

2. The apparatus according to claim 1, wherein
   the first substrate unit further includes an insulating layer provided between the first substrate and the first electrodes, the insulating layer having a hole, and
   one of the recesses conforms to the hole.

3. The apparatus according to claim 1, wherein the recesses include a first recess and a second recess adjacent to the first recess, and a distance between the first recess and the second recess is not more than a width of the first electrode in the second direction.

4. The apparatus according to claim 1, wherein the recesses include a first recess and a second recess adjacent to the first recess, and a width of the first recess in the second direction and a width of the second recess in the second direction are greater than a distance between the first recess and the second recess.

5. The apparatus according to claim 1, wherein the recesses include a first recess and a second recess adjacent to the first recess, and a center position of the first recess in the second direction is different from a center position of the second recess in the second direction.

6. The apparatus according to claim 1, wherein
   the first substrate unit further includes a plurality of electrode pairs provided on the first substrate to oppose the second electrode, the electrode pairs being arranged in the second direction,
   at least one of the electrode pairs is disposed in each of spaces between the first electrodes,
   the at least one of the electrode pairs includes
      a third electrode extending in the first direction,
      a fourth electrode extending in the first direction, and
      an insulating layer provided between the third electrode and the fourth electrode,
   the third electrode includes
      a first superimposed portion overlaying the fourth electrode when projected onto a plane parallel to the first direction and the second direction, and
      a first non-superimposed portion not overlaying the fourth electrode when projected onto the plane, and
   the fourth electrode includes
      a second superimposed portion overlaying the third electrode when projected onto the plane, and
      a second non-superimposed portion not overlaying the third electrode when projected onto the plane.

7. The apparatus according to claim 6, wherein
an effective value of a first voltage applied between the second electrode and the first electrodes is greater than an effective value of a voltage applied between the third electrode and the second electrode, and
the effective value of the first voltage is greater than an effective value of a voltage applied between the fourth electrode and the second electrode.

8. The apparatus according to claim 6, wherein the third electrode has a recess provided in a surface of the third electrode and the surface of the third electrode opposes the second electrode.

9. The apparatus according to claim 1, wherein a depth of one of the recesses from the surface in a direction perpendicular to the first substrate is not less than 0.5 µm and not more than 2 µm.

10. A liquid crystal optical apparatus, comprising:
a first substrate unit including
a first substrate, and
a plurality of first electrodes provided on the first substrate to extend along a first direction, the first electrodes being arranged in a second direction perpendicular to the first direction;
a second substrate unit including
a second substrate opposing the first substrate, and
a second electrode provided on the second substrate to oppose the first electrodes; and
a liquid crystal layer provided between the first substrate unit and the second substrate unit,
one of the first electrodes being provided with a recess formed on a surface of the one of the first electrodes, the surface opposing the second electrode, wherein the recess has a line configuration extending along the first direction.

11. The apparatus according to claim 10, wherein a width of the recess along the second direction changes in the first direction.

12. The apparatus according to claim 10, wherein the recess has a zigzag configuration including a plurality of bends having an angle that changes in the first direction.

13. The apparatus according to claim 12, wherein a distance in the first direction between mutually adjacent two of the bends is not more than a width of the one of the first electrodes in the second direction.

14. The apparatus according to claim 10, wherein
the recess is a first recess;
the one of the first electrodes is further provided with a second recess having a line configuration extending along the first direction; and
the first and second recesses are arranged along the second direction.

15. A liquid crystal optical apparatus, comprising:
a first substrate unit including
a first substrate, and
a plurality of first electrodes provided on the first substrate to extend along a first direction, the plurality of first electrodes being arranged in a second direction perpendicular to the first direction;
a second substrate unit including
a second substrate opposing the first substrate, and
a second electrode provided on the second substrate to oppose the first electrodes; and
a liquid crystal layer provided between the first substrate unit and the second substrate unit,
at least one of the first electrodes being provided with a plurality of protrusions formed on a surface of the at least one of the first electrodes, the surface opposing the second electrode, the protrusions being arranged along the first direction.

16. A stereoscopic image display device, comprising:
a liquid crystal optical unit; and
an image display unit stacked with the liquid crystal optical unit, the image display unit having a display surface configured to display an image,
the liquid crystal optical unit including:
a first substrate unit including
a first substrate, and
a plurality of first electrodes provided on the first substrate to extend along a first direction, the plurality of first electrodes being arranged in a second direction perpendicular to the first direction;
a second substrate unit including
a second substrate opposing the first substrate, and
a second electrode provided on the second substrate to oppose the first electrodes; and
a liquid crystal layer provided between the first substrate unit and the second substrate unit,
at least one of the first electrodes being provided with a recess formed on a surface of the at least one of the first electrodes, the surface opposing the second electrode.

17. The device according to claim 16, wherein
the image display unit includes a plurality of pixel groups including a plurality of pixels arranged in the second direction, and
each of the pixel groups is disposed to oppose a region between most proximal two of the first electrodes.

18. The device according to claim 16, further comprising a drive unit configured to apply a voltage to the first electrodes and the second electrode.

19. The device according to claim 18, wherein
the flat substrate unit further includes a plurality of electrode pairs provided on the first substrate to oppose the second electrode, the electrode pairs being arranged in the second direction,
at least one of the electrode pairs is disposed in each of spaces between the first electrodes,
the each of the electrode pairs includes
a third electrode extending in the first direction,
a fourth electrode extending in the first direction, and
an insulating layer provided between the third electrode and the fourth electrode,
the third electrode includes
a first superimposed portion overlaying the fourth electrode when projected onto a plane parallel to the first direction and the second direction, and
a first non-superimposed portion not overlaying the fourth electrode when projected onto the plane;
the fourth electrode includes
a second superimposed portion overlaying the third electrode when projected onto the plane, and
a second non-superimposed portion not overlaying the third electrode when projected onto the plane,
the drive unit applies a first voltage between the second electrode and the first electrodes, applies a third voltage between the third electrode and the second electrode, and applies a fourth voltage between the fourth electrode and the second electrode,
an effective value of the first voltage is greater than an effective value of the third voltage,
the effective value of the first voltage is greater than an effective value of the fourth voltage, and the effective value of the third voltage is greater than the effective value of the fourth voltage.

\* \* \* \* \*